United States Patent [19]
Cucheran et al.

[11] 3,796,461
[45] Mar. 12, 1974

[54] QUICK DISCONNECT SEAT BELT TONGUE

[75] Inventors: John S. Cucheran, Pleasant Ridge; William L. Pringle, Grosse Pointe, both of Mich.

[73] Assignee: Jim Robbins Seat Belt Company, Mt. Clemens, Mich.

[22] Filed: Sept. 29, 1971

[21] Appl. No.: 184,915

Related U.S. Application Data

[63] Continuation-in-part of Ser. No. 865,265, Oct. 10, 1969, abandoned.

[52] U.S. Cl. ............. 297/389, 24/201 HE, 24/223, 24/230 AM
[51] Int. Cl. ..................... A62b 35/60, A44b 17/00
[58] Field of Search ...... 297/385, 389, 384; 24/223, 24/224 HE, 224 SB, 224 LS, 224 R, 201 HE, 230 AM, 230 AN

[56] References Cited
UNITED STATES PATENTS
3,364,532 11/1968 Hatfield ........................ 24/230 AM
1,196,769 9/1916 Friedrich et al. .................. 24/224 B
3,456,981 7/1969 Radke et al. ...................... 24/223 X
3,526,432 9/1970 Jensen et al. ..................... 24/223 X
3,542,426 11/1970 Radke ............................... 297/389
3,562,766 2/1971 Dye .............................. 24/201 HE Primary Examiner—James T. McCall
Attorney, Agent, or Firm—Marvin Bressler

[57] ABSTRACT

A seat belt assembly including an elongated tongue plate connected to a seat belt at one end and adapted for insertion into a buckle at the other end. The tongue plate has an opening with an arcuate extremity. A latch member is movably mounted on the tongue plate and has an arcuate extension which is biased toward the arcuate extremity of the opening. A shoulder strap connecting plate member has an arcuate hook portion adjacent one end which matingly engages the arcuate extremity opening and is maintained or biased into mechanical interlocking engagement with the tongue plate by the latch member.

5 Claims, 6 Drawing Figures

PATENTED MAR 12 1974 3,796,461

INVENTOR.
John S. Cucheran
BY William L. Pringle
Barnard, McGlynn & Reising
ATTORNEYS

QUICK DISCONNECT SEAT BELT TONGUE

This is a continuation, of application Ser. No. 865,265, filed 10/69, now abandoned.

This invention relates to a seat belt assembly of the type including a combination seat belt and shoulder strap. Assemblies of this type include a seat belt with two halves for extending across a lap as they are buckled together by a buckle assembly. A shoulder strap extends across the shoulder and is connected to the buckle of the lap belt so that forces on the shoulder strap are transmitted to the anchoring points of the lap belts.

Various components had been utilized for connecting the shoulder strap to the lap belt; it is, however, an object and feature of this invention to provide an improved means for connecting the shoulder strap to the lap belt in a seat belt assembly.

In correlation with the foregoing object and feature, it is another object and feature to provide a seat belt assembly with a connector means attached to the end of a shoulder strap and a tongue means attached to a seat belt and insertable into a buckle and including buckle means for receiving and retaining the connector means of the shoulder strap.

Other objects and attendant advantages of the present invention will be readily appreciated as the same becomes better understood by reference to the following detailed description when considered in connection with the accompanying drawings wherein.

Referring now to the drawings wherein like numerals indicate like or corresponding parts throughout the several views, a seat belt assembly constructed in accordance with the instant invention is generally shown at 10.

Figure 6:
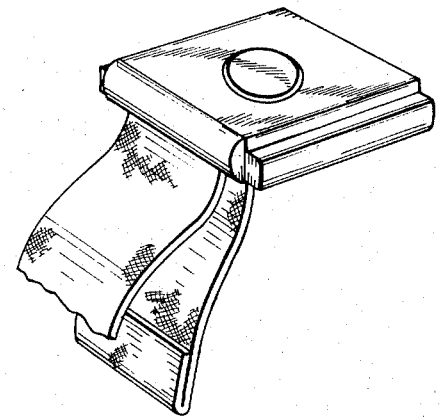
FIG. 6 is an isometric view of a typical buckle which may be used with this invention.

The assembly 10 includes a shoulder strap 12 and a connector means comprising the connector plate 14 attached to the shoulder strap 12. As illustrated, the shoulder strap 12 is looped through an opening 16 in the connector plate 14. The assembly 10 also includes a seat belt 18 and tongue means, generally indicated at 20, comprising the tongue plate 21 attached to the seat belt 18 by way of the opening 22. Also included is means comprising the opening 24 adapted for connection to a buckle. The end of the tongue plate 21, including the opening 24, may take any one of various configurations depending upon the type of buckle into which the tongue plate 21 is to be inserted. Various buckles well known in the art may be utilized for receiving and retaining the tongue plate 21, such as the buckle illustrated in FIG. 6.

The tongue means 20 also includes buckle means generally indicated at 26 for receiving and retaining the connector plate 14. The buckle means 26 includes a movable latch means 28 and the opening 30 in the tongue plate 21. The movable latch means 28 urges the connector plate 14 into mechanical interlocking engagement with the tongue plate 21. The latch means 26 is disposed on the tongue plate 21 for movement in the opening 30.

Figure 5:
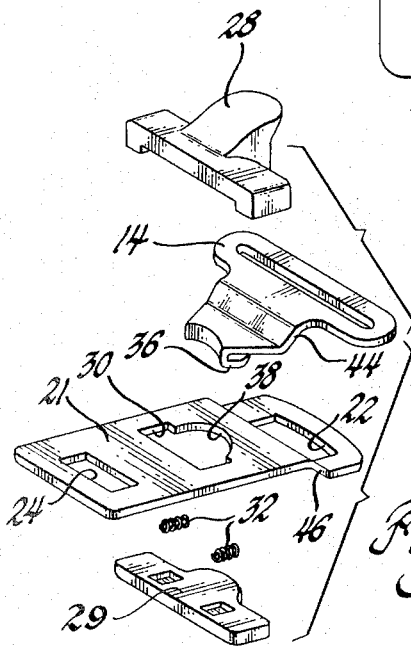
FIG. 5 is an exploded view of the preferred embodiment of the invention.
Figure 4:
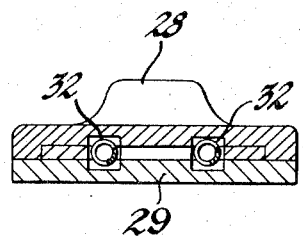
FIG. 4 is a cross sectional view taken substantially along line 4—4 of FIG. 1.

The latch means includes a latch member comprising upper and lower halves as best seen in FIGS. 4 and 5 and biasing means comprising the springs 32. The upper and lower members of the latch member 28 are disposed completely around the tongue plate 21 and are connected together as by bolts, screws, or the like. The springs 32 are disposed in recesses in the upper and lower members of the latch member 28 and react between the latch member 28 and a rearward extremity 34 of the opening 30.

The connector plate 14 includes a hook portion 36 for hooking engagement with extremity 38 of the opening 30.

The springs 32 urge the latch member 28 toward the extremity 38 of the opening 30 to retain the hook portion 36 in hooking engagement with the extremity 38 of the opening 30.

Both the extremity 38 of the opening 30 and the hook portion 36 are arcuate with the hook portion 36 being matingly arcuate with the extremity 38 so as to be in mating engagement or sliding engagement therealong. The hook portion 36 is concave and the latch member 28 includes a convex extension 40 for engaging the hook portion 36 and for urging it into engagement with the arcuate extremity 38. The connector plate 14 may move relative to the tongue plate 21 about the center of the arcuate extremity 38 while urged into engagement with the arcuate extremity 38 by the latch member 28 so that the longitudinal axis of the shoulder strap 12 may be disposed transversely of the longitudinal axis of the seat belt or lap belt 18. In other words, the hook portion 36 may move around the arcuate extremity 38 of the opening 30.

Figure 1:
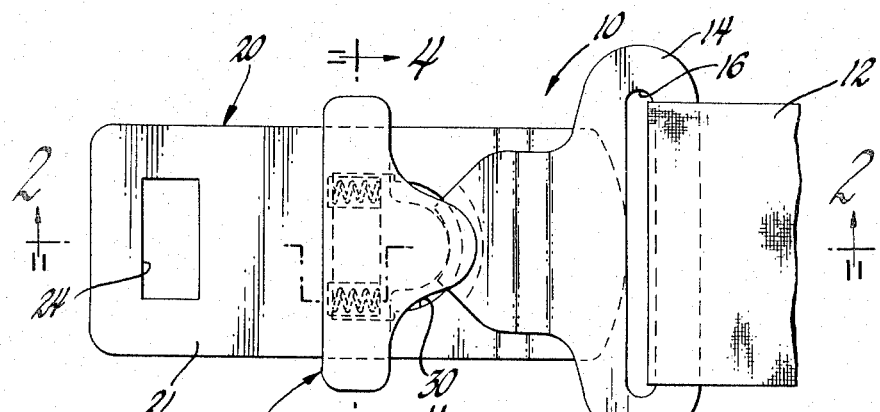
FIG. 1 is a fragmentary plan view of a preferred embodiment of the instant invention.
Figure 2:
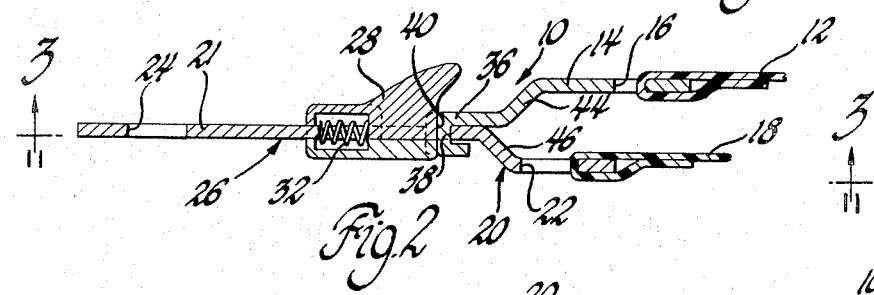
FIG. 2 is a cross sectional view taken substantially along line 2—2 of FIG. 1.
Figure 3:
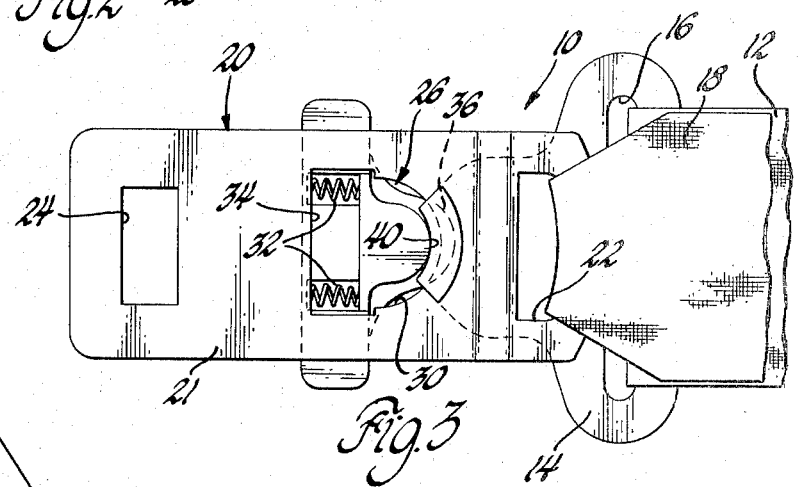
FIG. 3 is a view taken substantially along line 3—3 of FIG. 2.

As best illustrated in FIG. 2, the connector plate member 14 has the hook portion 36 at one end and is attached to the should strap 12 at the other end with the opposite ends thereof being in offset planes due to the offset 44. The tongue plate 21 is elongated with the seat belt 18 being attached at one end and the opening 24 for connection to a buckle disposed at the other end with the latch opening 38 disposed intermediate the ends thereof and with the opposite ends thereof being in offset planes due to the offset 46. The offsets 44 and 46 are in opposite directions.

The embodiments of the invention in which an exclusive property or privilege is claimed are defined as follows:

1. A seat belt assembly comprising:
a buckle, a shoulder strap, connector means attached to said shoulder strap, a seat belt, tongue means attached to said seat belt for reception in said buckle, said tongue means including buckle means disposed on said tongue means, said buckle means being independent of interrelationship with said buckle, said buckle means being adapted for receiving and retaining said connector means, said connector means including an arcuate hook portion and said buckle means including an arcuate extremity for engaging said arcuate hook portion of said connector means, whereby the longitudinal axis of said shoulder strap may be disposed transversely of the longitudinal axis of said seat belt, said buckle means including a movable latch means for urging said hook portion into mechanical interlocking engagement with said extremity, said latch means having biasing means adapted to retain said engagement of said arcuate hook portion of said connector means.

2. A seat belt assembly as set forth in claim 1 wherein said hook portion is concave and matingly arcuate with said extremity so as to be in sliding engagement therealong.

3. A seat belt assembly as set forth in claim 1 wherein said latch means comprises upper and lower halves, said upper and lower halves being disposed around said tongue means.

4. A seat belt assembly as set forth in claim 3 wherein said upper and lower halves of said latch means have recesses and wherein said biasing means comprises springs, said springs being disposed in said recesses and said springs reacting between said latch means and said tongue means.

5. A seat belt assembly as set forth in claim 1 wherein said connector means has an offset portion and said tongue means has an offset portion, said offset portions being in opposite directions.

* * * * *